Patented Dec. 25, 1934

1,985,452

UNITED STATES PATENT OFFICE 1,985,452

MANUFACTURE OF PURPURIN

Henry R. Lee, South Milwaukee, and Edwin C. Buxbaum, Shorewood Village, Wis., assignors to E. I. du Pont de Nemours & Company, Wilmington, Del., a corporation of Delaware No Drawing. Application January 25, 1933, Serial No. 653,478

8 Claims. (Cl. 260—58)

This invention relates to the manufacture of purpurin.

It is an object of this invention to provide a simple and economical method for the manufacture of purpurin (1,3,4-trihydroxy-anthraquinone). Other and further important objects of this invention will appear as the description proceeds.

We have found that purpurin may be readily prepared in good yield and in economic manner by reacting p-chloro-resorcinol with phthalic anhydride in concentrated sulfuric acid in the presence of boric acid. The reaction proceeds very smoothly, and requires no isolation of intermediate reaction products.

The latter effect is rather surprising, in view of the fact that 1,2,4-trihydroxy-benzene, which is formed as an intermediate product, is known to be a highly reactive, and therefore unstable, compound, and previous attempts to react this compound directly with phthalic anhydride have not proven successful. (Annalen, 411, 321-323.) In the same reference, the problem was solved by first esterifying the trihydroxy-benzene with acetic acid, and reacting the resulting triacetate with phthalic anhydride.

The formation of 1,2,4-trihydroxy-benzene in our process is evidenced by the evolution of hydrochloric acid gas as soon as the chloro-resorcinol comes in contact with the pre-warmed sulfuric acid-boric acid-phthalic anhydride reaction mass, even if the latter is at a lower temperature than the optimum temperature for ring-closure.

In our preferred procedure a mixture of phthalic anhydride, sulfuric acid monohydrate and boric acid is heated to about 80 to 100° C. Chlororesorcinol is then introduced, and when evolution of hydrochloric acid has substantially ceased or subsided, the mixture is heated to a temperature between 150 and 210° C., until the reaction is completed. However, this two-stage procedure is not absolutely necessary, as will be readily apparent from the examples given below.

Without limiting our invention to any particular procedure, the following examples, in which parts by weight are given, will serve to illustrate our preferred mode of operation.

Example 1

16 parts of sulfuric acid monohydrate are mixed with 1.33 parts of boric acid crystals and 3.5 parts of phthalic anhydride, and stirred until solution is complete. The mixture is then slowly heated to 80° C. over a period of one hour. 1 part of p-chloro-resorcinol is now added and the entire mass heated to a temperature of 185° C. in a period of 4-6 hours. The temperature is held at 184-187° for 16-17 hours. The charge is then cooled to 100° C.; 8.5 parts of water are added, and the mass cooled further to 30° C. and filtered. The filter cake, which constitutes the boric acid ester of purpurin, is washed first with 60% sulfuric acid, then with cold water until free of acid. It is then sucked dry, resludged in 71 parts of water, heated to boiling for one hour, diluted with 210 parts of water, cooled to 30 C., and filtered. The filter cake is washed with hot water (60-70° C.) until acid free to Congo red.

Purpurin prepared in this manner is a dark reddish-brown compound with a melting point of 256-257° C.

Example 2

16 parts of sulfuric acid monohydrate are mixed with 1.33 parts of boric acid and 3.5 parts of phthalic anhydride and stirred until solution is complete. The mixture is then heated to 90° over a period of one hour. 1 part of chloro-resorcinol is then added and the reaction mixture is brought to a temperature of 190° C., and held there for 16 hours. The charge is then cooled to 150° C., poured into 71 parts of water and heated to boiling for one hour. It is then diluted with 210 parts of water, filtered and washed with hot water (60-70° C.) until acid free to Congo red.

Example 3

19 parts of sulfuric acid monohydrate are mixed with 1.1 parts of boric acid and 3.5 parts of phthalic anhydride. The reaction mass is heated to a temperature of 190° C. and 1 part of chlororesorcinol is carefully added. The reaction begins at once and fumes of hydrochloric acid are evolved. The mass is maintained at 190-195° C. for four hours, then poured into 64 parts of cold water, heated up and boiled for 20 minutes and finally diluted with 304 parts of cold water, allowed to settle and filtered. The filter cake is sucked dry and washed acid free with warm water.

It will be understood that many variations are possible in our preferred mode of procedure without departing from the spirit of this invention. For instance, the quantity of sulfuric acid in the above examples may be varied widely, say between 8 and 30 parts by weight. Anhydrous boric acid may be used instead of crystals. Its quantity in either case may vary within wide limits, but should preferably not be less than 1 part by weight. The temperature of the condensation may vary between 150° and 210° C. and the period of time for ring-closure may correspondingly be varied between 48 and 4 hours.

It will be observed that we have provided a very simple and efficient method of manufacturing purpurin. The initial material is relatively inexpensive, and the process is practically a single step process, necessitating no isolation of any intermediate reaction products. Moreover, the yield and purity of purpurin prepared by our process are very high.

We claim:

1. The process of preparing purpurin, which comprises reacting phthalic-anhydride with p-chloro-resorcinol in a medium of sulfuric acid and boric acid.

2. The process of preparing purpurin, which comprises reacting phthalic anhydride with p-chloro-resorcinol in a medium of sulfuric acid monohydrate and in the presence of boric acid, and finishing the reaction mass at a temperature between 150° and 210° C.

3. In the process of preparing purpurin, the step which comprises heating p-chloro-resorcinol in a medium of sulfuric acid and boric acid to form 1,2,4-trihydroxy benzene.

4. In the process of preparing purpurin, the step which comprises heating p-chloro-resorcinol in a medium of sulfuric acid containing boric acid and phthalic anhydride.

5. In the process of preparing purpurin, the step which comprises adding p-chloro-resorcinol to a mass containing sulfuric acid, boric acid and phthalic anhydride, at a temperature above 80° C.

6. In the process of preparing purpurin, the step which comprises adding p-chloro-resorcinol to a mass containing sulfuric acid, boric acid and phthalic anhydride, at a temperature between 80 and 100° C.

7. The process of preparing purpurin, which comprises reacting p-chloro-resorcinol with sulfuric acid and boric acid to form 1,2,4-trihydroxy-benzene, and condensing the latter immediately with phthalic anhydride to form purpurin, in the same medium, without isolation of any intermediate products.

8. The process of preparing purpurin, which comprises heating 3.5 parts of phthalic anhydride in 8 to 30 parts of sulfuric acid containing not less than 1 part of boric acid, at a temperature of 80 to 100° C., adding substantially 1 part of p-chloro-resorcinol, and further heating the mass at a temperature between 150 to 210° C., for a period of time between 48 and 4 hours.

HENRY R. LEE.
EDWIN C. BUXBAUM.